(12) United States Patent
Shaheen et al.

(10) Patent No.: US 8,191,824 B2
(45) Date of Patent: Jun. 5, 2012

(54) INTEGRATED LOAD SENSING SYSTEM

(75) Inventors: Milad A. Shaheen, Rancho Santa Margarita, CA (US); Andrew M. Wright, Costa Mesa, CA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 455 days.

(21) Appl. No.: 12/426,258

(22) Filed: Apr. 19, 2009

(65) Prior Publication Data

US 2010/0264263 A1 Oct. 21, 2010

(51) Int. Cl.
*B64C 13/38* (2006.01)

(52) U.S. Cl. .................. 244/76 A; 244/75.1; 244/99.2

(58) Field of Classification Search .............. 244/76 R, 244/76 A, 87, 89, 129.1, 75.1, 99.2, 194
See application file for complete search history.

(56) References Cited

U.S. PATENT DOCUMENTS

| | | | | |
|---|---|---|---|---|
| 32,746 | A | | 7/1861 | Nelson |
| 3,695,096 | A | | 10/1972 | Kutsay |
| 3,838,684 | A | * | 10/1974 | Manuel et al. ............... 600/503 |
| 4,034,334 | A | * | 7/1977 | Allyn ........................... 340/945 |
| 4,225,926 | A | * | 9/1980 | Wendt .......................... 701/124 |
| 4,653,318 | A | * | 3/1987 | Jadwin et al. ............. 73/152.54 |
| 4,782,706 | A | | 11/1988 | Kister |
| 4,904,999 | A | * | 2/1990 | Klansnic et al. ............. 340/945 |
| 5,114,096 | A | | 5/1992 | Wernicke |
| 5,169,090 | A | * | 12/1992 | Wright et al. .............. 244/17.13 |
| 6,011,482 | A | | 1/2000 | Banks |
| 6,140,942 | A | | 10/2000 | Bragg |
| 6,195,518 | B1 | * | 2/2001 | Bennett et al. ................ 399/165 |
| 6,239,713 | B1 | | 5/2001 | Harvey |
| 6,389,915 | B1 | | 5/2002 | Wngett |
| 6,672,540 | B1 | | 1/2004 | Shaheen |
| 6,735,505 | B2 | * | 5/2004 | Levine ............................ 701/35 |
| 7,121,505 | B2 | * | 10/2006 | Chronister ................... 244/75.1 |
| 7,299,702 | B2 | | 11/2007 | Gibert |
| 7,651,263 | B2 | * | 1/2010 | Zolock et al. ................. 374/110 |
| 8,033,500 | B1 | * | 10/2011 | Charafeddine et al. ...... 244/75.1 |
| 2006/0170535 | A1 | | 8/2006 | Watters |
| 2007/0148788 | A1 | * | 6/2007 | Hsieh et al. ........................ 438/3 |
| 2007/0205405 | A1 | * | 9/2007 | Stockmaster et al. ......... 254/275 |
| 2008/0211510 | A1 | * | 9/2008 | Zolock et al. ................. 324/451 |
| 2009/0083459 | A1 | * | 3/2009 | Harish ............................ 710/63 |
| 2010/0001701 | A1 | * | 1/2010 | Cygan et al. .................. 323/282 |
| 2010/0131158 | A1 | * | 5/2010 | Saito ............................... 701/50 |

* cited by examiner

*Primary Examiner* — Benjamin P Lee
*Assistant Examiner* — Joshua Freeman
(74) *Attorney, Agent, or Firm* — Donna P. Suchy; Daniel M. Barbieri

(57) ABSTRACT

An integrated load sensing system includes a housing including a coupling pin portion thereof. A bridge circuit includes a set of strain gauges bonded to the coupling pin portion. A bridge circuit excitation, error correction, and amplification (BCEECA) subsystem is operatively connected to the bridge circuit for receiving indications of shear load from the strain gauges, correcting signal error, and amplifying the indications of shear load. The BCEECA subsystem provides amplified output signals. A power conditioning module is operatively connected to the BCEECA subsystem for receiving power from an external power supply and conditioning power to an appropriate state for driving the bridge circuit as well as an appropriate state for error correction and amplification circuitry within the BCEECA subsystem. A logic module compares the amplified output signals to a predetermined signal threshold and provides latching of enunciation in accordance with a selected delay after the threshold is surpassed. An enunciation element providing enunciation of the output signals surpassing the signal threshold in accordance with the logic module. The bridge circuit, the BCEECA subsystem, the power conditioning module, the logic module, and the enunciation element are contained and sealed within the housing. The invention includes a method for in situ testing of a shear load sensing system for a mechanical system.

9 Claims, 10 Drawing Sheets

INTEGRATED LOAD SENSING SYSTEM

BACKGROUND OF THE INVENTION

1. Field of the Invention

The present invention relates to load sensing systems and more particularly to a load sensing system particularly adaptable for use with aircraft actuation systems for providing load path integrity monitoring.

2. Description of the Related Art

Modern aircraft have horizontal stabilizers located at the rear tail section of the fuselage or the forward section that are pivotally supported relative to the airplane fuselage to "trim" the aircraft during flight by selective adjustment by the operator or auto-pilot from an internal control unit. The stabilizer actuator is a variable length structural link connecting the horizontal stabilizer control surface to the fuselage structure and used to control the pitch (attitude) of the aircraft during take off, cruise and landing phases under different aerodynamic loading conditions. The stabilizer actuator is also used to recover the aircraft during severe aircraft stall situations. In this regard the stabilizer is traditionally pivotally connected to the rear section or tail section of the fuselage.

One common trimmable horizontal stabilizer actuator consists of a primary ball nut assembly connected with an actuating drive gimbal which is pivotally connected to one end of the horizontal stabilizer structure. The ball nut assembly includes a ball nut housing and a rotatable ball screw extending axially and usually vertically through the ball nut housing and a drive gimbal housing. The ball nut housing is connected to the drive gimbal housing by a trunnion segment. The ball screw, in turn, has its upper end remote from the actuating drive gimbal and is fixed from translation or axial movement by a connection to a second, support gimbal which is pivotally secured to the vertical stabilizer section or the tail section. As the ball screw is rotated, the drive gimbal will be moved in translation relative to it. Thus as the ball screw is rotated in one direction, the leading edge of the horizontal stabilizer is pivoted upward, whereas by rotating the ball screw in the other direction, the leading edge of the horizontal stabilizer is pivoted downward. Rotation of the ball screw is routinely done by a motor (electric or hydraulic, depending on system architecture) and associated gearing which is connected to the second, fixed support gimbal and which is actuated by the operator or pilot by the internal control unit. The connection of the stabilizer actuator to the stabilizer is located within the vertical stabilizer or fuselage tail section and not directly in the air stream.

The horizontal stabilizer movement, as controlled by the operator or auto-pilot, is transmitted by the ball screw through the actuating drive gimbal by way of the primary ball nut assembly which defines a primary load path. The movement has a load with tensile and compressive components as well as a torque component due to the ball screw thread lead. Failures of the primary load path such as caused by the shearing off of the connecting trunnion segment, ball screw disconnect or by the loss of nut ball members from the ball nut assembly can result in the complete loss of control of the horizontal stabilizer. However, stabilizer actuators have frequently been provided with a secondary load path for alternate control of the stabilizer and structural integrity, as well as to meet the required level of safety (failure of single load path actuator has a catastrophic outcome on the aircraft). In such structures, the primary load path is normally controllably actuated by the operator and is thus under load while the secondary load path is normally unactuated and thus unloaded. In the event of a primary load path failure, the secondary load path is automatically mobilized whereby the stabilizer actuator can continue to be controllably actuated by the operator or pilot by the internal control unit to control the position of the stabilizer. The transition of control to the secondary load path can occur quite rapidly whereby failure of the primary load path is not necessarily detected by the operator or pilot.

However, in the event of a subsequent failure of the secondary load path through continued, periodic use, control of the stabilizer will be completely lost which could result in erratic, oscillatory movement of the stabilizer whereby the ability of the pilot or operator to control the aircraft could be substantially inhibited. This problem is addressed by the present invention.

This problem was addressed in, for example, U.S. Pat. No. 6,672,540, entitled "Actuator For Aircraft Stabilizers With a Failure Responsive Lock Control Mechanism," issued to M. A. Shaheen et al, and assigned to the present assignee, that discloses a horizontal stabilizer actuator for a winged aircraft which is selectively pivotally controlled by a pilot or operator at a remote location in the aircraft and which has a primary load path responsive to the selective control by the pilot or operator for setting the pivoted position of the stabilizer and which has a secondary load path which is responsive to a failure in the primary load path to be automatically actuated to a condition locking the stabilizer in a fixed position. The solution offered by the '540 patent offers detection of the actuator secondary load path engagement by means of a lock that will trigger and jam the ball screw in the event of a primary load path failure and secondary lock engagement. The jammed and immobilized actuator will stall the drive motor which is detected and annunciated by the system controller, thus annunciating the fault in the actuator. This solution is feasible when dealing with jamming devices needed to generate lock torque less than 3000 in-lb, which is feasible for actuators used on regional jets and small corporate jets. This solution becomes limited when dealing with large body aircraft. With large body aircraft the torque needed to stall the drive motor by means of locking and jamming the ball screw is extremely high (more than 10,000 in-lb) and is infeasible and unachievable without hugely impacting the envelope (volume) and weight of the actuator (especially the ball screw gimbal area where the lock is mounted).

The trend in aviation regulations shows that it is ever more desirable to have intelligent systems be aware in real time of the state of certain active elements, such as control surfaces. U.S. Pat. No. 7,299,702, entitled "Apparatus For Monitoring An Aircraft Flap and Application of a Dynamometric Rod," issued to F. Gibert, discloses and claims using a dynamometric pin for replacing a flap hinge pivot. The pin differs from dynamometric pins or shafts known in the previous prior art firstly because its sensing elements are enclosed inside the body of the pin, which is itself closed by packing, so they are not subjected to bad weather, and secondly because they possess the external characteristics of the pivots presently in use for mounting flap arms, and so they require no modification to the flaps, to the arms, or to the wing. However, the '702 device is deficient because it assumes that the surface is directly mounted to the aircraft structure and does not address the need to monitor the integrity of the load paths of actuators that actuate the control surfaces and that are typically mounted between the aircraft structure and the respective control surfaces. This solution maybe applicable to very light aircraft where the control surface is directly connected to the aircraft structure and it is manually controlled by cables, pulleys and control rod without actuators.

The dynamometric pin disclosed in the '702 patent is substantially that disclosed in U.S. Pat. No. 3,695,096, entitled "Strain Detecting Load Cell," issued to A. U. Kutsay. The '096 patent discloses and claims a strain detecting load cell which is adapted to replace or be readily interchangeable with a coupling member such as a pin or bolt. The working dimensions of the cell and the part replaced are the same, except that the cell has short zones of slightly decreased diameter so that the shear strains are concentrated in these zones. An axial bore in the cell contains electrical strain gauges attached to its circumferential wall within the concentrating zones and having leads for connection to exterior measuring instrumentation such as Wheatstone bridge equipment. The arrangement and orientation of the gauges in the concentrating zones permit evaluation of the applied load both as to magnitude and direction.

U.S. Ser. No. 12/150,365, filed on Apr. 28, 2008, entitled "Actuator Load Path Monitoring System", by Abbas M. Charafeddine et al, and assigned to present assignee discloses an actuator load path monitoring system for an aircraft having an aircraft structure, a control surface, and, an actuator connected between the aircraft structure and the control surface to support and position the control surface as desired relative to the aircraft structure. The actuator is of a type including a) an upper actuator assembly securely connected to the aircraft structure, including a motor assembly and gear assembly; b) a ball screw assembly operatively connected to the gear assembly; c) a tie-rod assembly (also called a safety-rod or safety-bar assembly) positioned within the ball screw assembly; and, d) a lower actuator assembly securely connected to the control surface, wherein actuation of the ball screw provides selected positioning of the control surface. The actuator load path monitoring system includes an upper load sensing assembly positioned in an upper load path between the upper actuator assembly and the aircraft structure. The upper load sensing assembly provides upper indications of the applied forces in the upper load path when the upper load path is disconnected. A lower load sensing assembly is positioned in a lower load path between the lower actuator assembly and the control surface. The lower load sensing assembly provides upper indications of the applied forces in the lower load path when the lower load path is disconnected. A computer system receives the upper and lower indications of applied forces and analyzes the upper and lower indications, thereby monitoring the structural integrity and safety of the upper and lower load paths by annunciating the detection of a failed portion thereof.

The Charafeddine et al patent application also discloses use of a dynamometric pin such as disclosed in Gibert and Kutsay. In all of the above cases the load sensing assemblies are not provided in an integrated fashion. In other words, the power supply conversion, logic, and enunciation modules are not incorporated into a single housing with the dynamometric pin. Also, for aircraft applications there is a need for in situ testing of the load sensing assembly because of the catastrophic consequences of sensor dormancy. As will be disclosed below, the systems and methods described herein solve these aforementioned problems.

SUMMARY OF THE INVENTION

In a broad aspect, the present invention is an integrated load sensing system. The integrated load sensing system includes a housing including a coupling pin portion thereof. A bridge circuit includes a set of strain gauges bonded to the coupling pin portion. A bridge circuit excitation, error correction, and amplification (BCEECA) subsystem is operatively connected to the bridge circuit for receiving indications of shear load from the strain gauges, correcting signal error, and amplifying the indications of shear load. The BCEECA subsystem provides amplified output signals. A power conditioning module is operatively connected to the BCEECA subsystem for receiving power from an external power supply and conditioning power to an appropriate state for driving the bridge circuit as well as an appropriate state for error correction and amplification circuitry within the BCEECA subsystem. A logic module compares the amplified output signals to a predetermined signal threshold and provides latching of enunciation in accordance with a selected delay after the threshold is surpassed. An enunciation element provides enunciation of the output signals surpassing the signal threshold in accordance with the logic module. The bridge circuit, the BCEECA subsystem, the power conditioning module, the logic module, and the enunciation element are contained and sealed within the housing.

In another broad aspect the present invention is embodied as a method for in situ testing of a shear load sensing system for a mechanical system. In a first step of this method a load sensing system is provided having a capability of sensing torsion loads not normally produced during operation with the same sensor elements used to sense shear loads produced during normal operation. The load sensing system is then installed in the mechanical system. The load sensing system is activated by applying a known torsion thereto, thereby producing a torsion induced signal. The proper functionality of the shear load sensing system is verified by determining if the torsion induced signal matches an expected signal based upon the known torsion.

In another broad aspect the present invention is embodied as an actuator system for an aircraft of a type having a primary aircraft structure, a secondary aircraft structure and a control surface positionable relative to said primary and secondary aircraft structures. The load path between the primary and secondary aircraft structure and the control surface defines a dual load path. The actuator system includes an upper actuator assembly; a ball screw assembly; a tie-rod assembly; and, a lower actuator assembly.

The upper actuator assembly includes an upper actuator assembly housing. A gear assembly is supported by the upper actuator assembly housing. A motor assembly is operatively associated with the gear assembly. An upper primary gimbal assembly is mounted to the upper actuator assembly housing, the upper primary gimbal assembly being securely connected to a primary aircraft structure. An upper load sensing assembly is securely attached to a secondary aircraft structure.

The ball screw assembly is operatively connected to the gear assembly, the ball screw assembly includes: a ball screw; a ball nut assembly translatable along the ball screw; and, a secondary inverted thread nut in an unloaded standby mode operatively positioned about the ball nut assembly.

The tie-rod assembly is positioned within the ball screw assembly. The tie-rod assembly has an upper end securely attached to the upper load sensing assembly, wherein the upper load sensing assembly defines an upper portion of a secondary load path of a dual load path between the secondary aircraft structure and a control surface. The dual load path includes a primary load path acting and reacting to the applied aerodynamic load to the control surface and the secondary load path in a stand-by, unloaded mode, the upper load sensing assembly providing upper indications of the applied forces in the upper portion of the secondary load path when an upper portion of the primary load path is disconnected.

The lower actuator assembly, includes: i) a lower primary gimbal assembly operatively connected to the ball screw assembly, defining a lower portion of the primary load path; ii) a lower secondary gimbal assembly positioned about the lower primary gimbal assembly and securely connected to the control surface; iii) a yoke assembly operatively connected to the secondary inverted thread nut and to the lower secondary gimbal assembly; and, iv) a lower load sensing assembly securely attached to the yoke assembly for providing the operative connection between the yoke assembly (operatively connected to the secondary nut) and the lower secondary gimbal assembly (operatively connected to the control surface).

A lower portion of the primary load path is defined by the load from the ball screw to the ball nut assembly to the lower primary gimbal assembly to the control surface. A lower portion of the secondary load path is defined by the load from the ball screw to the secondary inverted thread nut to the yoke assembly to the lower load sensing assembly to the lower secondary gimbal assembly to the control surface. The lower load sensing assembly provides lower indications of the applied forces in the lower portion of the secondary load path when the lower portion of the primary load path is disconnected.

At least one of the load sensing assemblies comprises an integrated load sensing system. The integrated load sensing system, comprises a housing including a coupling pin portion thereof. A bridge circuit includes a set of strain gauges bonded to the coupling pin portion for receiving one of either i) the upper indications of the applied forces or ii) the lower indications of the applied forces. A bridge circuit excitation, error correction, and amplification (BCEECA) subsystem is operatively connected to the bridge circuit for receiving indications of shear load from the strain gauges, correcting signal error, and amplifying the indications of shear load. The BCEECA subsystem provides amplified output signals. A power conditioning module is operatively connected to the BCEECA subsystem for receiving power from an external power supply and conditioning power to an appropriate state for driving the bridge circuit as well as an appropriate state for error correction and amplification circuitry within the BCEECA subsystem. A logic module compares the amplified output signals to a predetermined signal threshold, and providing latching of enunciation in accordance with a selected delay after the threshold is surpassed. An enunciation element provides enunciation of the output signals surpassing the threshold in accordance with the logic module. The bridge circuit, the BCEECA subsystem, the power conditioning module, the logic module, and the enunciation element are contained and sealed within the housing The present invention provides adjustment/rigging-free, extremely light and compact solution which directly measures secondary load path loading in real time. By virtue of its fully integrated design, it is easily retrofit into existing applications with minimal electrical and mechanical interfacing. System controllers previously blind to path loading could make decisions based on direct measurement rather than depending on assumption. Furthermore, inspection cycles of currently uninstrumented platforms can be improved by retrofitting the present invention. Costs associated with testing the present invention are reduced by requiring no special tools for in situ testing. In addition, the testing in the present invention fully tests all aspect of the system from the bonding of the strain sensing elements to the BCEECA subsystem, logic module, enunciation module, and power supply conversion. It is hermetically sealed and easily field replaceable as well as designed to aerospace environmental requirements per the RTCA DO160 standard.

DETAILED DESCRIPTION OF THE INVENTION

Figure 1:
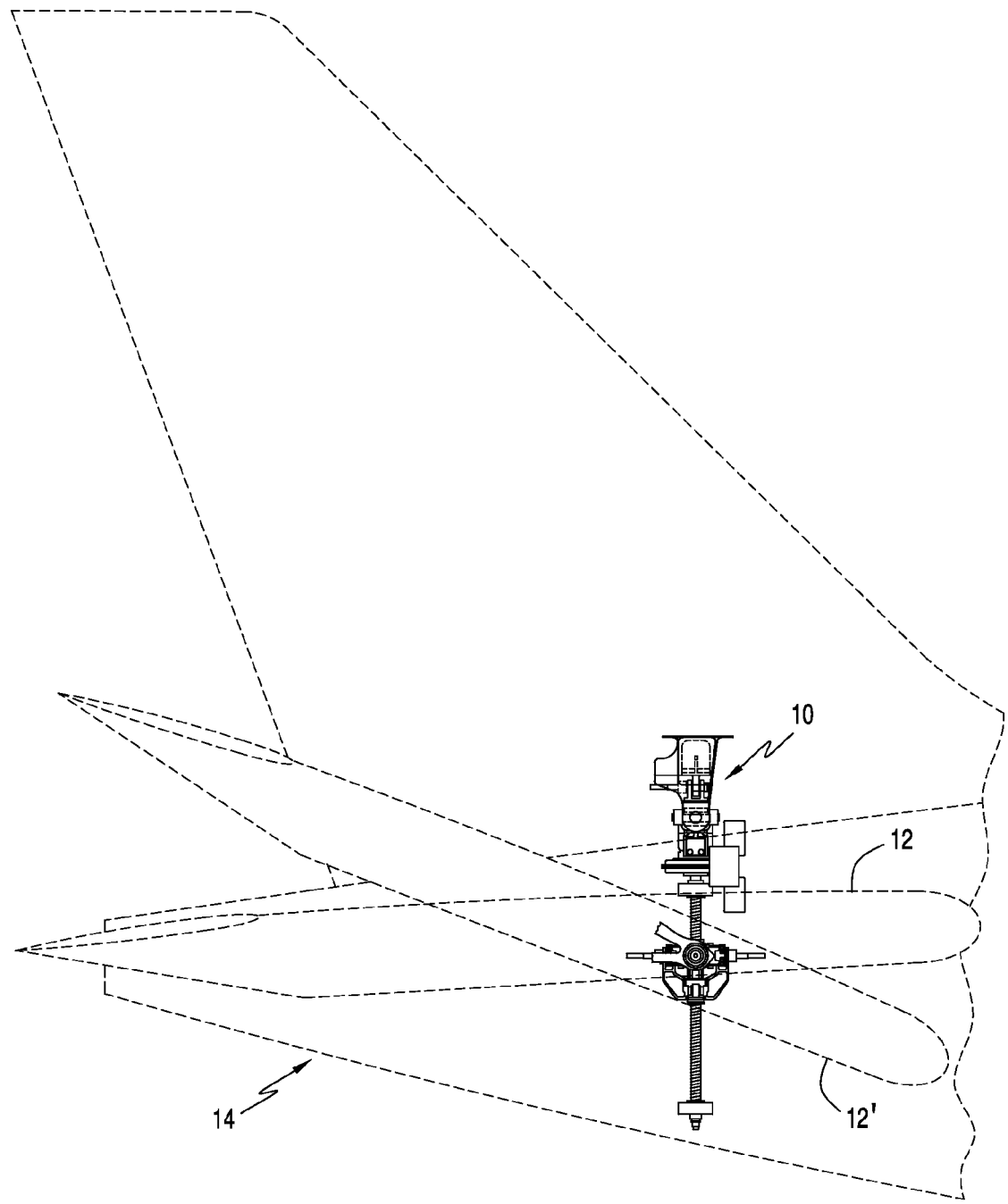
FIG. 1 is a schematic illustration of the actuator system of the present invention, shown affixed to the horizontal stabilizer of a large body aircraft.

Referring now to the drawings and the characters of reference marked thereon, FIG. 1 illustrates the actuator system, designated generally as 10, in accordance with the principles of the present invention, embodied for use with a horizontal stabilizer 12 of an aircraft 14. The actuator 10 functions along its stroke to facilitate pivoting of the horizontal stabilizer 12 as shown by numeral designation 12' (aircraft pitched nose up).

Figure 2:
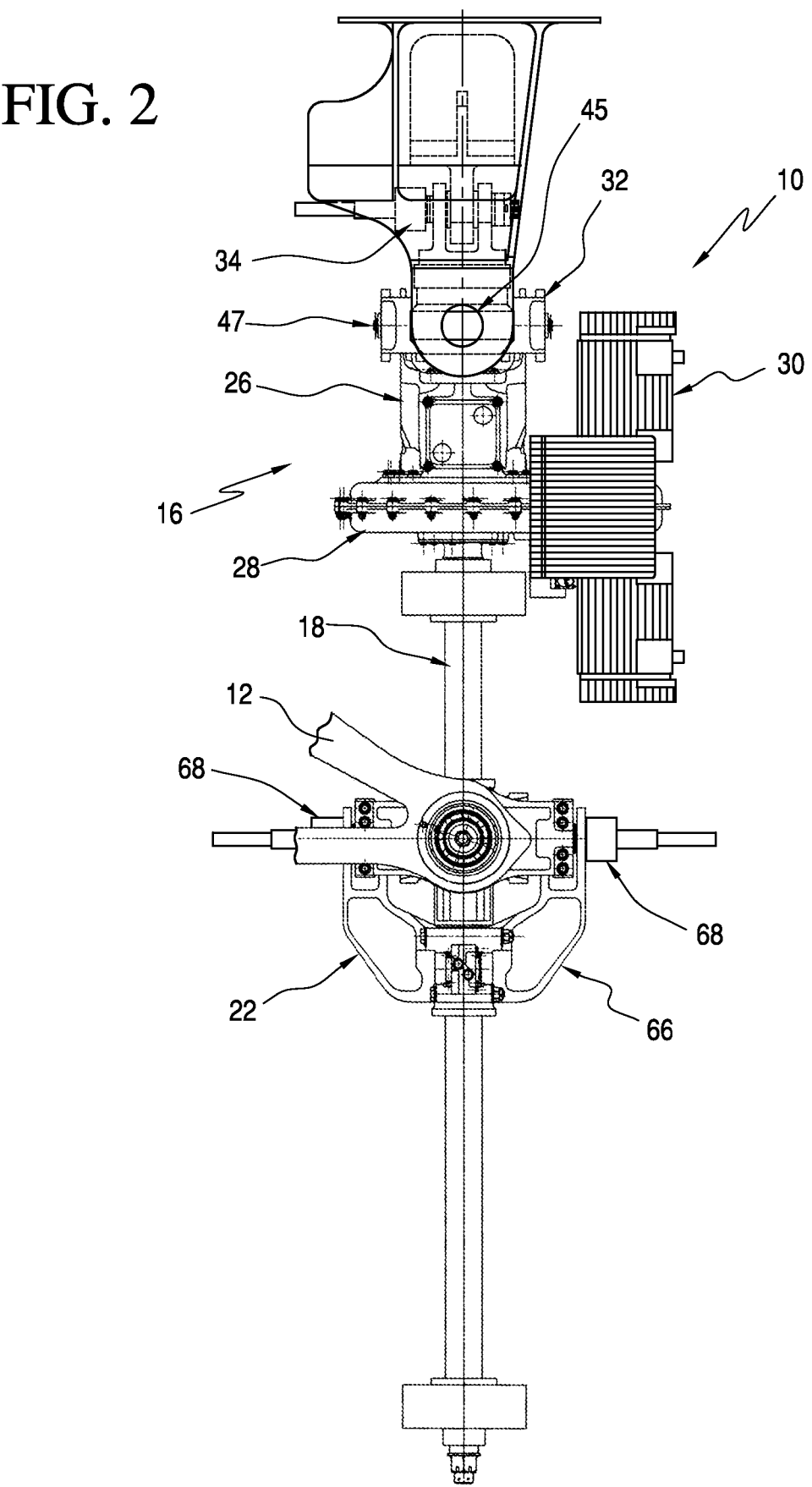
FIG. 2 is an enlarged side view of the actuator system of FIG. 1.
Figure 3:
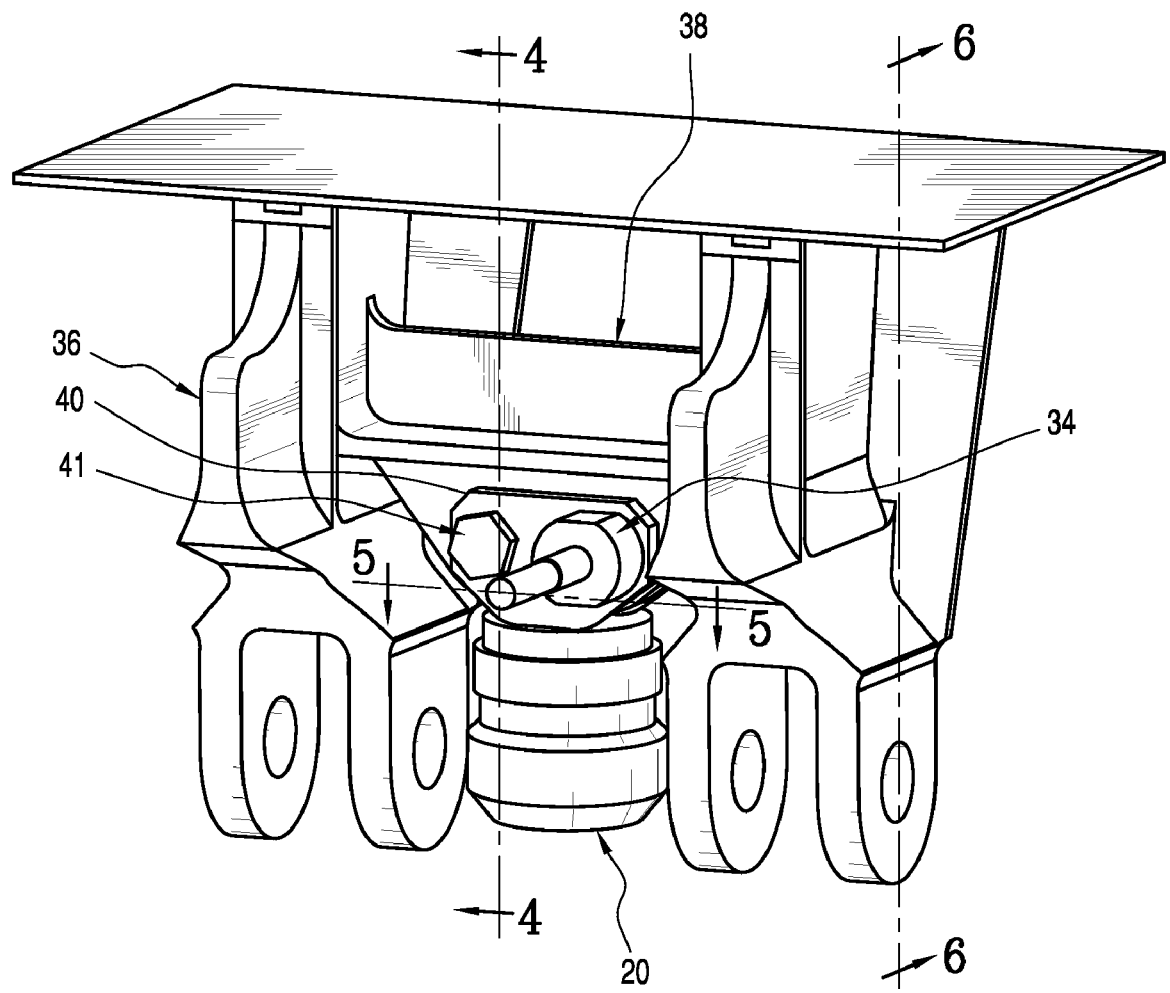
FIG. 3 is a perspective view of a portion of the upper actuator assembly of the actuator system with multiple upper load sensing assembly shown.
Figure 4:
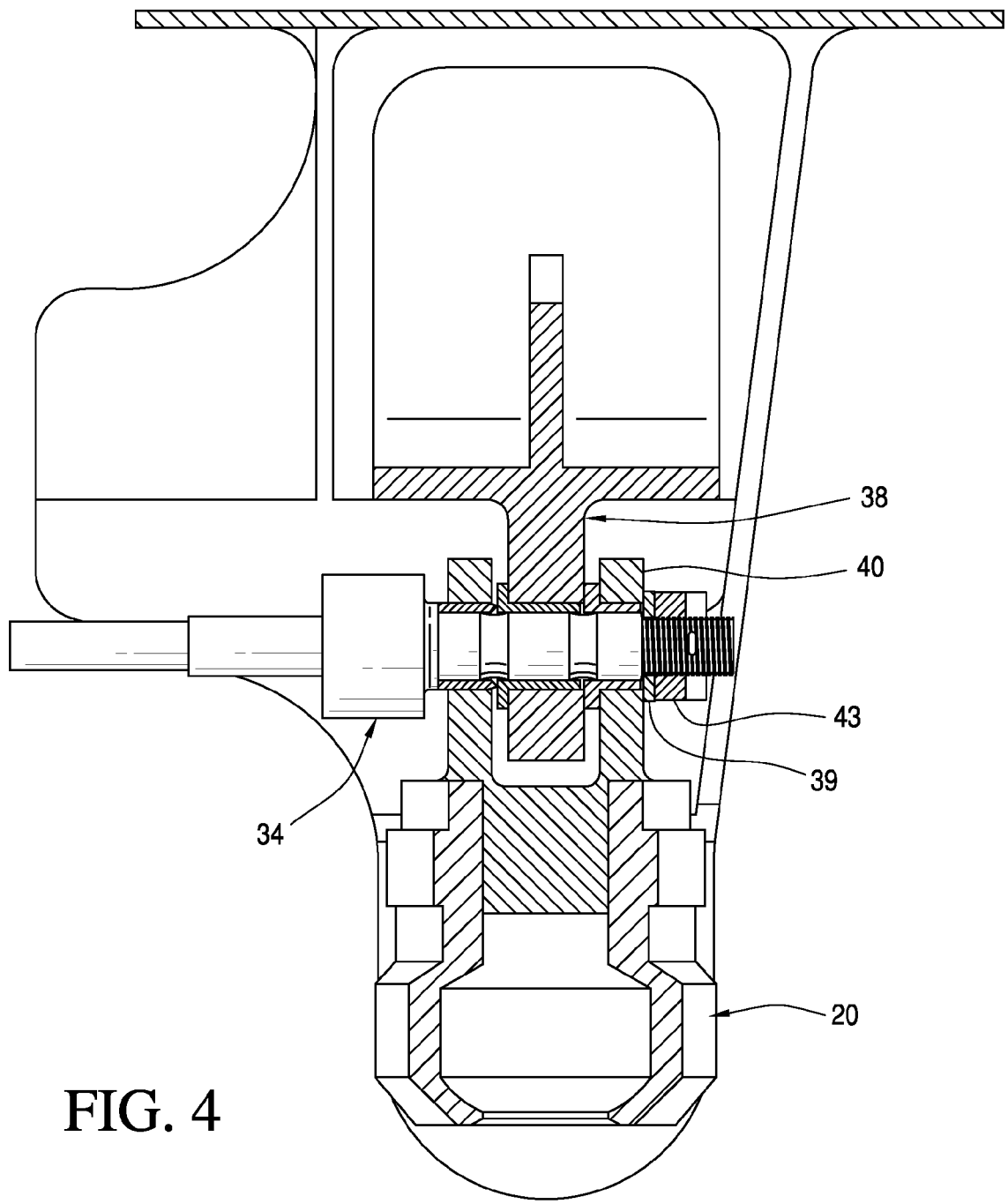
FIG. 4 is a view taken along line 4-4 of FIG. 3.
Figure 5:
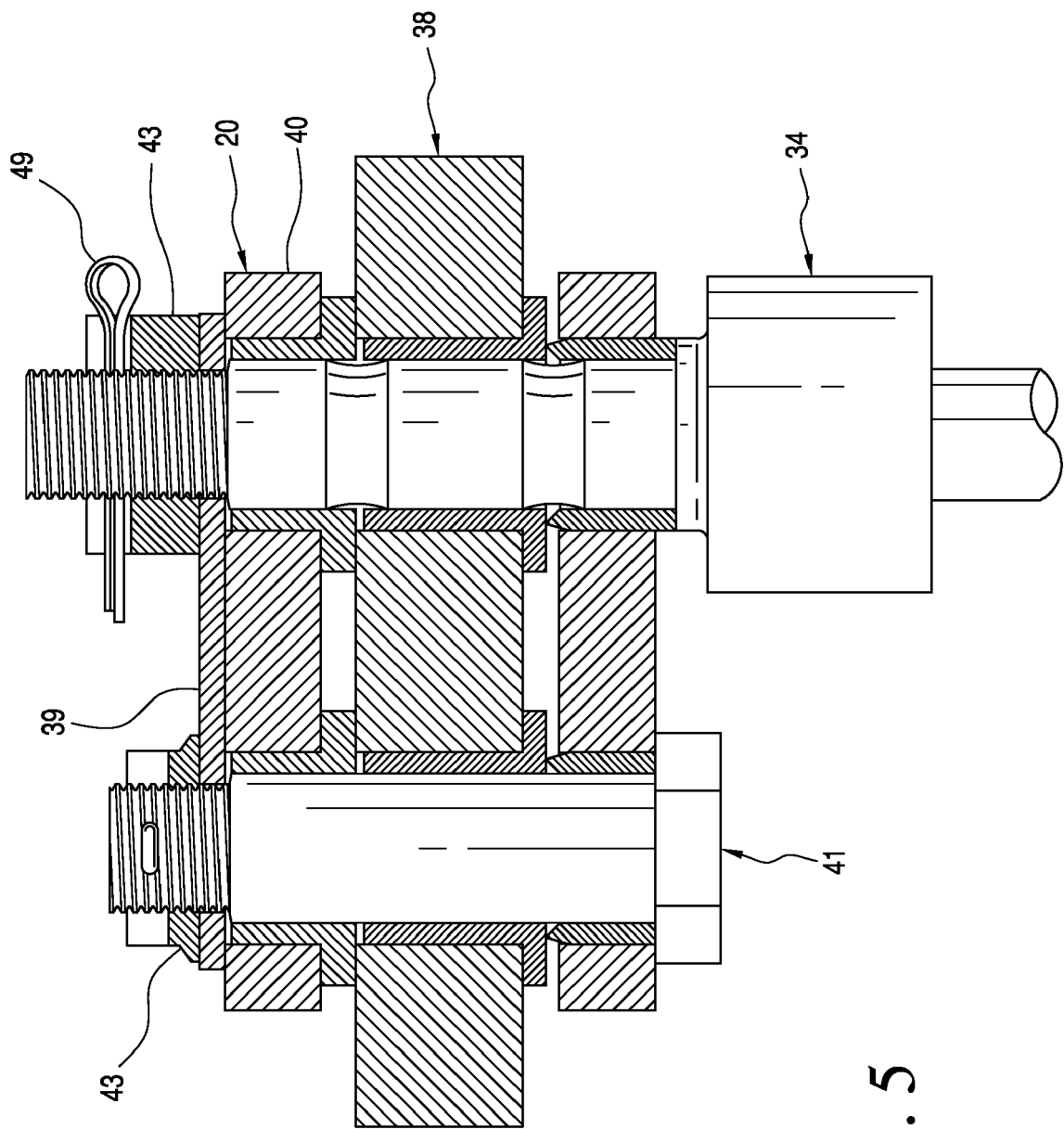
FIG. 5 is a view taken along line 5-5 of FIG. 3.
Figure 6:
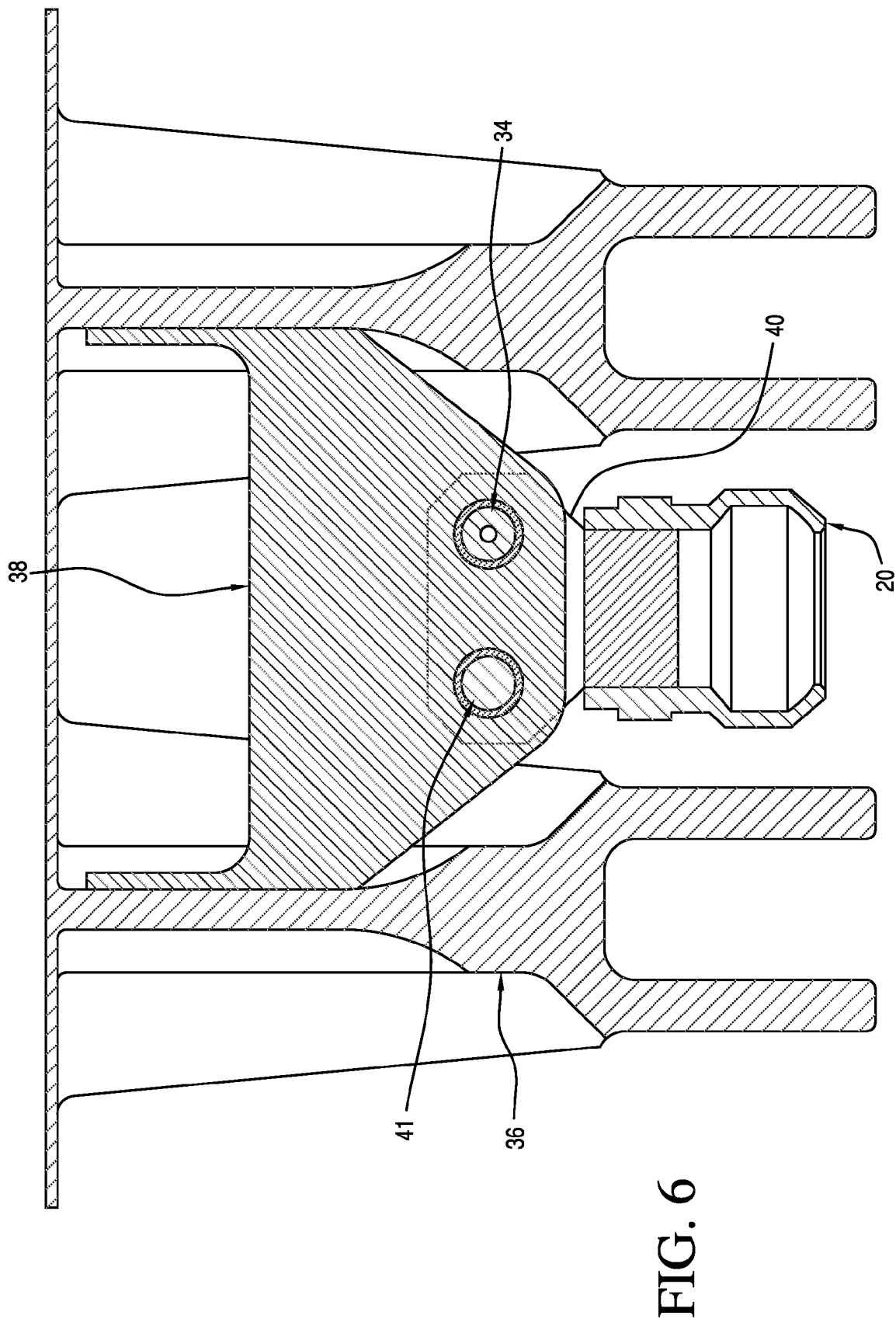
FIG. 6 is a view taken along line 6-6 of FIG. 3.

Referring now to FIG. 2, the actuator system includes an upper actuator assembly 16; a ball screw assembly 18; a tie-rod assembly 20 (shown in subsequent figures); and, a lower actuator assembly 22.

With references to FIGS. 2-6, the upper actuator assembly 16 includes an upper actuator assembly housing 26; a gear assembly 28 supported by the upper actuator assembly housing 26; a motor assembly 30 operatively associated with the gear assembly 28; an upper primary gimbal assembly 32 mounted to the upper actuator assembly housing 26; and, an upper load sensing assembly 34. The upper primary gimbal assembly 32 is securely connected to a primary aircraft structure 36. The upper load sensing assembly 34 is securely attached to a secondary aircraft structure 38.

The upper end of the tie-rod assembly 20 forms a clevis 40 that is securely attached to the upper secondary aircraft structure 38 which forms a tongue using upper load sensing assembly 34. The upper load sensing assembly 34 in this case is defined by a single integrated load sensing system (described in detail below with respect to FIG. 11), which, is radially clocked and axially positioned and retained against the clevis 40. The radial clocking is achieved using an anti-rotation bracket 39 rotationally constraining the load sensing assembly 34 to the adjacent stock bolt 41. The axial positioning and retaining is achieved using castellated nuts 43 with cotter pin retainers 49.

The upper load sensing assembly 34 provides part of the upper portion of the secondary load path of the dual load path between the secondary aircraft structure 38 and the horizontal stabilizer 12. The dual load path includes a primary load path acting and reacting the applied aerodynamic load to the horizontal stabilizer 12 and the secondary load path in a stand-by, unloaded mode. The upper load sensing assembly 34 provides upper indications of the applied forces in the upper portion of the secondary load path when an upper portion of the primary load path is disconnected (such as failure in upper primary gimbal 32, failure in connection between upper primary gimbal 32 and housing 26 represented by bolt 47, failure of housing 26 or failure in the connection between upper primary gimbal 32 and primary aircraft structure 36 represented by pin 45, etc.). The ball screw assembly 18 is positioned about the tie-rod assembly 20.

Figure 7:
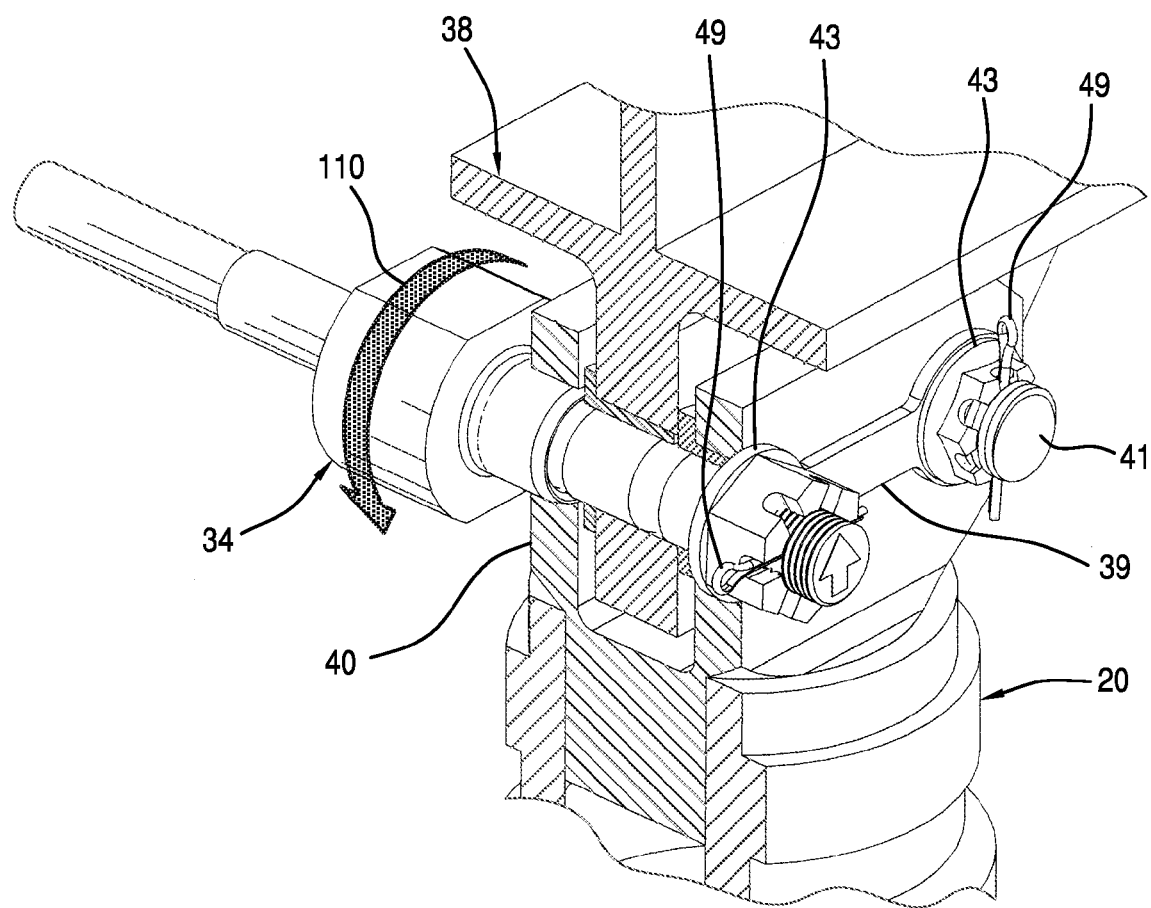
FIG. 7 is a perspective view of a single integrated load sensing system installed within the actuator system.

Referring now to the section view in FIG. 7, the installed integrated load sensing system 34 is illustrated. The stock bolt 41 is first inserted into the clevis 40 and tongue from the upper secondary aircraft structure 38 thereby connecting the secondary load paths of the aircraft and actuator. After aligning the second set of holes in the clevis 40 and tongue, a coupling pin portion of the integrated load sensing system 34 is inserted in the same orientation as the adjacent stock bolt 47. The anti-rotation bracket 39 includes two holes, one of which contains flats which interface with the aligned flats at the base of the threaded section of the integrated load sensing system 34, thereby constraining rotation between the anti-rotation bracket and the load sensing system. After twisting the integrated load sensing system 34 to the appropriately clocked orientation, the anti-rotation bracket 39 is then affixed to the clevis 40 such that both protruding threaded portions of the integrated load sensing system 34 and stock bolt 47 project through the holes of the anti-rotation bracket 39. Nuts are threaded onto the threaded ends of the load sensing system 34 and the stock bolt 47 which are protruding from the holes in the anti-rotation bracket 39. After torqueing the nuts to the appropriate preload, additional means of nut retention such as cotter pins 49 are then installed to prevent undue disassembly of the secondary load path.

Figure 8:
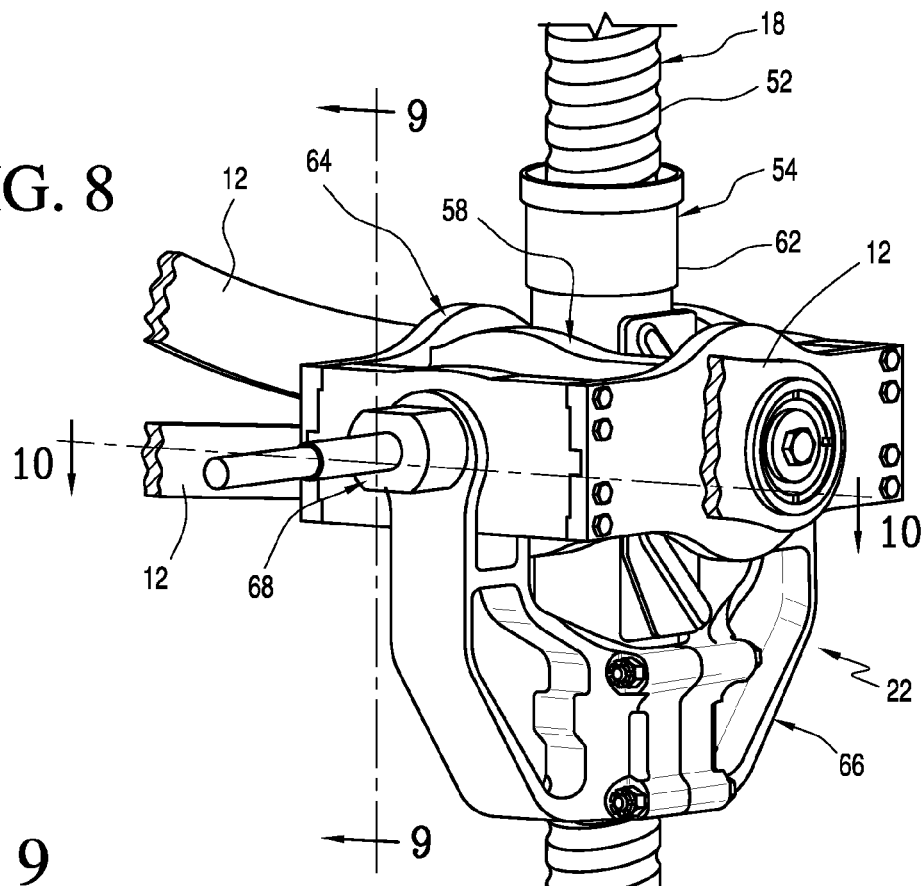
FIG. 8 is a perspective view of a portion of the lower actuator assembly of the actuator system.
Figure 9:
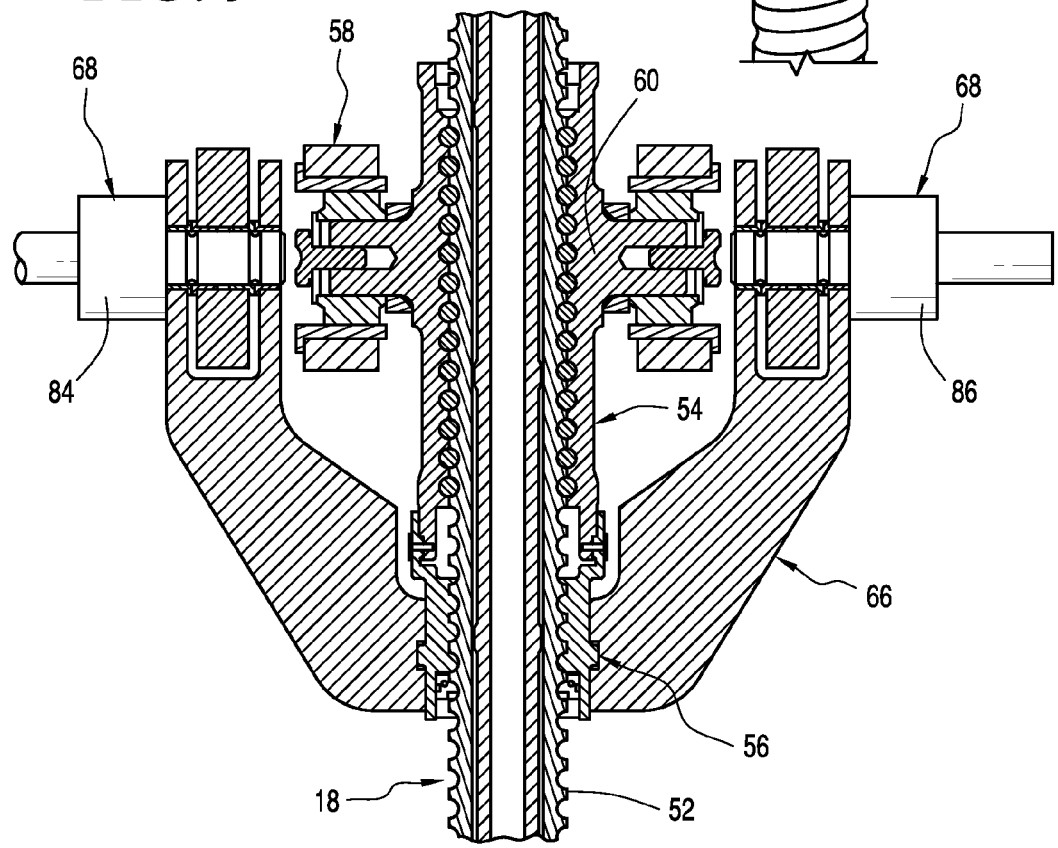
FIG. 9 is a view taken along line 9-9 of FIG. 8.
Figure 10:
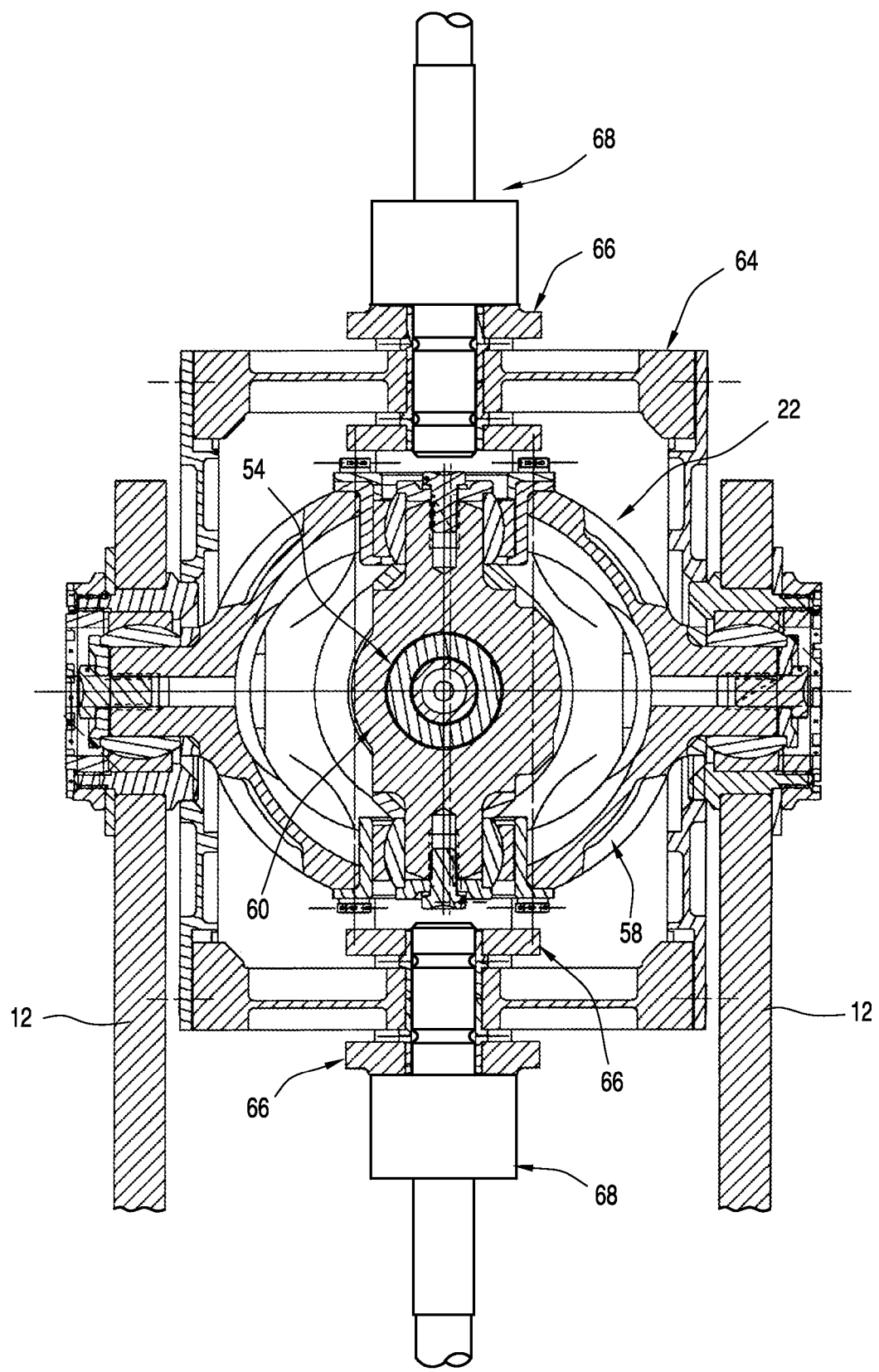
FIG. 10 is a view taken along line 9-9 of FIG. 8.

Referring now to FIGS. 8-10, the ball screw assembly 18 includes a ball screw 52, a ball nut assembly 54 translatable along the ball screw 52, and a secondary inverted thread nut 56 in an unloaded standby mode operatively positioned about the ball nut assembly 54. Instead of using a ball screw assembly another type of power screw (i.e. jack screw) can be used such as an Acme screw assembly.

The lower actuator assembly 22 includes a lower primary gimbal assembly 58 operatively connected to the ball screw assembly 18 through a trunnion 60 part of the ball nut assembly 54. This defines a lower portion the primary load path (i.e. attachment to the horizontal stabilizer 12). A lower secondary (square) gimbal assembly 64 is positioned about the lower primary gimbal assembly 58 and securely connected to the horizontal stabilizer 12. A yoke assembly 66 is operatively connected to the secondary inverted thread nut 56 and to the lower secondary gimbal assembly 64.

A lower load sensing assembly 68 is securely attached to the yoke assembly 66 for providing the operative connection between the yoke assembly 66 and the lower secondary gimbal assembly 64. Thus, a lower portion of the primary load path is defined by the load path from the ball screw 52 to the ball nut assembly 54 to the lower primary gimbal assembly 58 to the control surface 12. A lower portion of the secondary load path is defined by the load from the ball screw 52 to the secondary inverted thread nut 56 to the yoke assembly 66 to the lower load sensing assembly 68 to the lower secondary gimbal assembly 64 to the control surface 12. The lower load sensing assembly 68 provides lower indications of the applied forces in the lower portion of the secondary load path when the lower portion of the primary load path is disconnected.

The secondary inverted thread nut 56 maintains an attachment of the lower actuator assembly 22 to the control surface 12 upon failure.

The lower load sensing assembly 68 in this case is defined by two integrated load sensing systems 84 and 86 (discussed below in detail), each of which is radially clocked and axially positioned and retained against yoke assembly 66. The radial clocking is achieved using a flat in the load sensing system housing that is matched against a corresponding flat in the yoke assembly 66.

The upper load sensing assembly 34 preferably comprises a single integrated load sensing system. Similarly, the lower load sensing assembly 68 preferably comprises a pair of integrated load sensing systems 84, 86. Each of these integrated load sensing systems preferably includes a dynamometric type of load sensing pin having at least one strain gauge bridge positioned within the housing of the pin. Such a type of load sensing pin is disclosed in U.S. Pat. No. 3,695,096, discussed above, entitled "Strain Detecting Load Cell," issued to A. U. Kutsay. U.S. Pat. No. 3,695,092 is incorporated by reference herein, in its entirety. Because of the safety and criticality of the upper load sensing assembly, the pin portion of the upper load sensing assembly is designed to contribute as a load bearing member to the structural limit and ultimate loads. The same applies to the lower load sensing assembly.

U.S. Pat. No. 7,299,702, entitled "Apparatus For Monitoring An Aircraft Flap and Application of a Dynamometric Rod," issued to F. Gibert, also discussed above, also discloses such a type of load sensing element. U.S. Pat. No. 7,299,702, is incorporated by reference herein, in its entirety.

Each of the integrated load sensing systems is environmentally and hermetically sealed and capable of operating in an aircraft environment of −65° C. to +85° C. Each has external characteristics commensurate for mating engagement with respective mating surfaces of the upper actuator assembly and lower actuator assembly. Thus, the integrated load sensing systems are very compact and fit within the original envelope of an actuator and can be retrofitted on already designed aircraft in service as well as newly developed programs.

Figure 11:
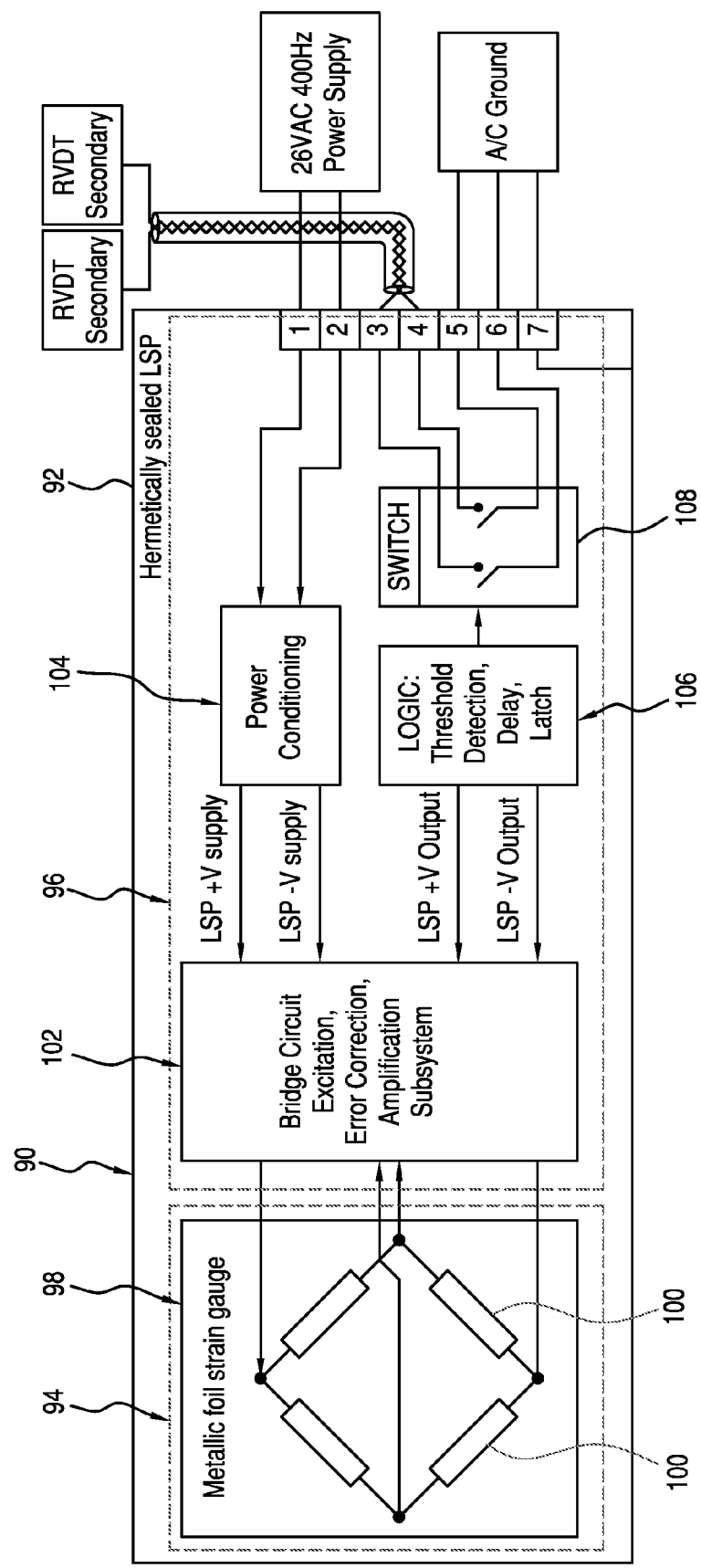
FIG. 11 is a block diagram of the integrated load sensing system of the present invention.

Referring now to FIG. 11, a preferred embodiment of the integrated load sensing system, designated generally as 90, is shown in accordance with the principles of the present invention. The integrated load sensing system 90 includes a housing 92 that includes a coupling pin portion 94 and an electronic portion 96. These two portions 94, 96 are integrated as a unitary unit within a hermetically sealed stainless steel housing. A bridge circuit, designated generally as 98, includes a set of strain gauges 100 bonded to the coupling pin portion 94. In the preferred embodiment the bridge circuit 98 is typically a Wheatstone bridge, however, other types of suitable circuits may be used. The strain gauges are bonded in an orientation to detect shear of the coupling pin.

A bridge circuit excitation, error correction, and amplification (BCEECA) subsystem 102 is operatively connected to the bridge circuit 98 for receiving indications of shear load from the strain gauges 100, correcting signal error, and amplifying the indications of shear load. The BCEECA subsystem 102 provides amplified output signals compensated for the error effects such as temperature.

A power conditioning module 104 is operatively connected to the BCEECA subsystem 102 for receiving power from an AC or DC external power supply and conditioning power to an appropriate state for driving the bridge circuit 98 as well as an appropriate state for error correction and amplification circuitry within the BCEECA subsystem 102.

A logic module 106 compares the amplified output signals to a predetermined signal threshold, and provides latching of enunciation in accordance with a selected delay after the threshold is surpassed. The selected delay may reset if the amplified output signal drops within the predetermined signal threshold before latching takes place.

An enunciation element 108 provides enunciation of the output signals surpassing the signal threshold in accordance with the logic module 106. The enunciation element 108 is preferably a switch. In order to provide fail-safe operation, the switch may provide a normally enunciated condition in the absence of electrical power.

The bridge circuit 98, the BCEECA subsystem 102, the power conditioning module 104, the logic module 106, and the enunciation element 108 are contained and sealed within the housing. The housing 92 is preferably formed of stainless steel; however, other suitable materials may be utilized such as aluminum. It is preferably hermetically sealed to prevent moisture contamination. Furthermore, although this invention has been described with respect to the use of strain gauges, alternative strain sensors can be used such as fiber optic sensing elements.

An aspect of this invention is the ability of the integrated load sensing system to be tested in situ. It is capable of being tested without special Ground Service Equipment (GSE), and without artificially loading the load path in which it is affixed. This is accomplished by utilizing the capability of the strain gauges to sense torsion loads not normally produced during operation along with their ability to sense shear loads produced during normal operation. After the load sensing system is installed in the actuator system it is activated by applying a known applied torsion thereto, thereby producing a torsion induced signal. Referring again now to FIG. 7, this applied torsion is designated 106. The proper functionality of the integrated load sensing system can be determined if the torsion induced signal matches an expected signal based upon the predetermined torsion. In other implementations of known applied loads, torsion may be simply recorded and compared against the output from the BCEECA subsystem or from the enunciation element (i.e. no "predetermination" per se is involved).

In an implementation where only binary outputs are allowed, the logic module includes means for setting the known applied torsion to a level at which an expected signal based upon the known applied torsion surpasses the predetermined signal threshold. The logic module compares the amplified output signals induced by the known applied torsion to the predetermined signal threshold. Binary enunciation is provided if the predetermined shear load signal threshold is surpassed.

In an implementation where ranged outputs can be used, the logic module includes means for directly accessing the amplified output signals induced by the known applied torsion. The logic module compares the amplified output signals induced by the known applied torsion to an expected signal based upon the known applied torsion.

The logic module may be, for example, an integrated circuit, an ASIC, or a comparator circuit. Or, it may be implemented in software.

In an example of use, the installed integrated load sensing system is in a normally enunciated state before power is applied. Once powered up, the integrated electronics self checks and provided no load is applied which passes the preset threshold, sets the switch to the non-enunciated state. While powered, the integrated load sensing system continually monitors the level of strain of the instrumented coupling pin through the amplification and error correction electronics. If the load signal surpasses the preset signal level commensurate with a specified threshold load, the delay timer for latching initiates. If the applied load exceeds the threshold for the duration of the delay timer, an illegal condition is enunciated. The enunciated state is latched until electrical power to the integrated load sensing system is removed at which time the latch is cleared and the load sensing system is reset for power up. Full functionality of the integrated load sensing system is verified by applying torsion to the instrumented portion of the coupling pin. The appropriate torsion activates the strain sensing elements to a level which provides an output signal surpassing the preset threshold. The resultant latched enunciation indicates proper functionality of the integrated load sensing system.

In case of the failure in the primary load path, the secondary load path will become loaded and the load sensing elements will transmit, a signal reflecting this increased load. A secondary load path engagement detection condition is set. If this condition is confirmed by the flight control computer, the brake of the motor is engaged, thus immobilizing the system until safe continuation of flight and landing and replacement of the faulty actuator after landing.

Although the present invention has been described in detail above with the upper load sensing assembly and lower load sensing assembly being mounted on the secondary load path it can be alternatively implemented to serve a similar purpose by loading it on the primary load path. A further alternative would be to implement it on a single load path and simply monitor the single load path such as in a trailing edge flap actuation system or leading edge slat actuation system where multiple single load path actuators are mounted to a single control surface. A further alternative would be to mount the actuator in an orientation in which the lower load sensing assembly is above or at the same height as the upper load sensing assembly. Also, the upper load sensing assembly may connect the secondary load path of the horizontal stabilizer to the secondary load path of the actuator while the lower load sensing assembly connects the aircraft secondary load path to the actuator.

In the event of implementation on the primary load path, the present invention enables continuous monitoring and recording of loads reacted by the actuator system throughout its life on the aircraft allowing visibility on the history of the actuator system for maintenance and overhaul interval optimization purposes.

Although the invention has been described with respect to utilization with a horizontal stabilizer it may be implemented with a variety of control surfaces such as an aileron, a wing trailing edge flap, a wing leading edge slat, an elevator, an Elevon (control surface performing roles of elevator and aileron), a Flaperon (a control surface performing roles of wing flap trailing edge and aileron), or wing (for variable wing sweep aircraft).

Furthermore, the method of in situ testing described herein has applications broader than aircraft applications and can be used with a great variety of mechanical systems which use a shear load sensing pin including oil rigging, vehicle load sensing, and other clevis/rod-end type linkage arrangements. In summary, this method of in situ testing includes, first, providing a load sensing system having a capability of sensing torsion loads not normally produced during operation with the same sensor elements used to sense shear loads produced during normal operation. The load sensing system is installed in a mechanical system. The load sensing system is then activated by applying a known torsion thereto, thereby producing a torsion induced signal. The proper functionality of the shear load sensing system is verified by determining if the torsion induced signal matches an expected signal based upon the known torsion.

In an implementation where only binary outputs are allowed, proper functionality is verified by, first applying the known torsion to a level at which the expected signal surpasses a predetermined signal threshold.

In an implementation where ranged outputs can be used proper functionality is verified by directly accessing the torsion induced signal; and, then comparing the torsion induced signal to the expected signal based upon the known torsion. Proper functionality is determined by the level of deviation of the comparison.

Other embodiments and configurations may be devised without departing from the spirit of the invention and the scope of the appended claims.

The invention claimed is:

1. An actuator system for an aircraft of a type having a primary aircraft structure, a secondary aircraft structure and a control surface positionable relative to said primary and secondary aircraft structures, the load path between the primary and secondary aircraft structure and the control surface defining a dual load path, said actuator system, comprising:
 a) an upper actuator assembly, comprising:
  i. an upper actuator assembly housing;
  ii. a gear assembly supported by said upper actuator assembly housing;
  iii. a motor assembly operatively associated with said gear assembly;
  iv. an upper primary gimbal assembly mounted to said upper actuator assembly housing, said upper primary gimbal assembly being securely connected to a primary aircraft structure; and,
  v. an upper load sensing assembly securely attached to a secondary aircraft structure;
 b) a ball screw assembly operatively connected to said gear assembly, said ball screw assembly, comprising:
  i. a ball screw;
  ii. a ball nut assembly translatable along said ball screw; and,
  iii. a secondary inverted thread nut in an unloaded standby mode operatively positioned about said ball nut assembly;
 c) a tie-rod assembly positioned within said ball screw assembly, said tie-rod assembly having an upper end securely attached to said upper load sensing assembly, wherein said upper load sensing assembly defines an upper portion of a secondary load path of a dual load path between the secondary aircraft structure and a control surface, said dual load path including a primary load path acting and reacting the applied aerodynamic load to the control surface and said secondary load path in a stand-by, unloaded mode, said upper load sensing assembly providing upper indications of the applied forces in said upper portion of said secondary load path when an upper portion of the primary load path is disconnected;
 d) a lower actuator assembly, comprising:
  i. a lower primary gimbal assembly operatively connected to said ball screw assembly, defining a lower portion of the primary load path;
  ii. a lower secondary gimbal assembly positioned about said lower primary gimbal assembly and securely connected to the control surface;
  iii. a yoke assembly operatively connected to said secondary inverted thread nut and to said lower secondary gimbal assembly; and,
  iv. a lower load sensing assembly securely attached to said yoke assembly for providing said operative connection between said yoke assembly and said lower secondary gimbal assembly, wherein,
   1. a lower portion of said primary load path is defined by the load from said ball screw to said ball nut assembly to said lower primary gimbal assembly to said control surface;
   2. a lower portion of said secondary load path is defined by the load from said ball screw to said secondary inverted thread nut to said yoke assembly to said lower load sensing assembly to said lower secondary gimbal assembly to said control surface; and,
   3. said lower load sensing assembly provides lower indications of the applied forces in said lower portion of said secondary load path when the lower portion of said primary load path is disconnected; and,
 wherein at least one of said load sensing assemblies, comprises an integrated load sensing system, comprising:
  a) a housing including a coupling pin portion thereof;
  b) a bridge circuit comprising a set of strain gauges bonded to said coupling pin portion for receiving one of either i) said upper indications of the applied forces or ii) said lower indications of the applied forces;
  c) a bridge circuit excitation, error correction, and amplification (BCEECA) subsystem operatively connected to said bridge circuit for receiving indications of shear load from said strain gauges, correcting signal error, and amplifying said indications of shear load, wherein said BCEECA subsystem provides amplified output signals;
  d) a power conditioning module operatively connected to said BCEECA subsystem for receiving power from an external power supply and conditioning power to an appropriate state for driving the bridge circuit as well as an appropriate state for error correction and amplification circuitry within said BCEECA subsystem;
  e) a logic module for comparing said amplified output signals to a predetermined signal threshold, and providing latching of enunciation in accordance with a selected delay after said threshold is surpassed; and,
  f) an enunciation element providing enunciation of said output signals surpassing said threshold in accordance with said logic module,
 wherein, said bridge circuit, said BCEECA subsystem, said power conditioning module, said logic module, and said enunciation element are contained and sealed within said housing.

2. The actuator system of claim 1, wherein said control surface comprises a horizontal stabilizer.

3. The actuator system of claim 1, wherein said control surface comprises an aileron.

4. The actuator system of claim 1, wherein said control surface comprises a wing trailing edge flap.

5. The actuator system of claim 1, wherein said control surface comprises a wing leading edge slat.

6. The actuator system of claim 1, wherein said control surface comprises an elevator.

7. The actuator system of claim 1, wherein said control surface comprises an Elevon.

8. The actuator system of claim 1, wherein said control surface comprises a Flaperon.

9. The actuator system of claim 1, wherein said control surface comprises a wing.

* * * * *